United States Patent
Kim et al.

(10) Patent No.: US 10,231,261 B2
(45) Date of Patent: *Mar. 12, 2019

(54) METHOD AND APPARATUS FOR TRANSMITTING AND RECEIVING MCS INDEX FOR 256QAM IN WIRELESS ACCESS SYSTEM

(71) Applicant: LG ELECTRONICS INC., Seoul (KR)

(72) Inventors: Bonghoe Kim, Anyang-si (KR); Dongyoun Seo, Anyang-si (KR); Yunjung Yi, Anyang-si (KR); Joonkui Ahn, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/632,757

(22) Filed: Jun. 26, 2017

(65) Prior Publication Data
US 2017/0295593 A1   Oct. 12, 2017

Related U.S. Application Data

(63) Continuation of application No. 15/208,096, filed on Jul. 12, 2016, now Pat. No. 9,698,960, which is a (Continued)

(51) Int. Cl.
*H04W 72/12* (2009.01)
*H04L 5/00* (2006.01)
(Continued)

(52) U.S. Cl.
CPC ........ *H04W 72/1289* (2013.01); *H04L 1/0003* (2013.01); *H04L 1/0016* (2013.01); (Continued)

(58) Field of Classification Search
CPC ........ H04L 5/0092; H04L 5/001; H04L 27/03; H04W 24/02; H04J 3/00
See application file for complete search history.

(56) References Cited

U.S. PATENT DOCUMENTS

2008/0188259 A1   8/2008  Blanz et al.
2009/0103497 A1   4/2009  Fernandez-Corbaton et al.
(Continued)

*Primary Examiner* — Lan-Huong Truong
(74) *Attorney, Agent, or Firm* — Birch, Stewart, Kolasch & Birch, LLP

(57) ABSTRACT

A method is provided for transmitting downlink data in a wireless access system. An evolved Node B (eNB) transmits a higher layer signal including an indication that 256 quadrature amplitude modulation (256QAM) is to be enabled. The eNB transmits, via a physical downlink control channel (PDCCH), downlink control information (DCI) for scheduling a physical downlink shared channel (PDSCH). The eNB transmits, via the PDSCH, downlink data based on the DCI. The eNB has a first MCS index table supporting up to 64 quadrature amplitude modulation (64QAM) and a second MCS index table supporting up to 256QAM. The downlink data is encoded based on the first MCS index table even though the second MCS index table has been enabled, when a format of the DCI is a DCI format 1A and the DCI format 1A has been scrambled with a semi persistent scheduling radio network temporary identifier (SPS-RNTI).

16 Claims, 10 Drawing Sheets

Related U.S. Application Data continuation of application No. 14/107,709, filed on Dec. 16, 2013, now Pat. No. 9,419,772.

(60) Provisional application No. 61/886,652, filed on Oct. 4, 2013, provisional application No. 61/883,190, filed on Sep. 27, 2013, provisional application No. 61/738,361, filed on Dec. 17, 2012.

(51) Int. Cl.
*H04L 27/36* (2006.01)
*H04L 1/00* (2006.01)

(52) U.S. Cl.
CPC ............ *H04L 5/001* (2013.01); *H04L 5/0053* (2013.01); *H04L 5/0092* (2013.01); *H04L 27/36* (2013.01); *H04L 27/361* (2013.01); *H04W 72/1273* (2013.01)

(56) References Cited

U.S. PATENT DOCUMENTS

| | | |
|---|---|---|
| 2010/0151874 A1 | 6/2010 | Cai et al. |
| 2010/0238845 A1 | 9/2010 | Love et al. |
| 2011/0128883 A1 | 6/2011 | Chung et al. |
| 2011/0216723 A1 | 9/2011 | Sartori et al. |
| 2011/0222485 A1 | 9/2011 | Nangia et al. |
| 2012/0269144 A1 | 10/2012 | Suzuki et al. |
| 2013/0205176 A1 | 8/2013 | Qian et al. |
| 2013/0208606 A1 | 8/2013 | Merlin et al. |
| 2015/0036567 A1 | 2/2015 | Park et al. |

FIG. 4
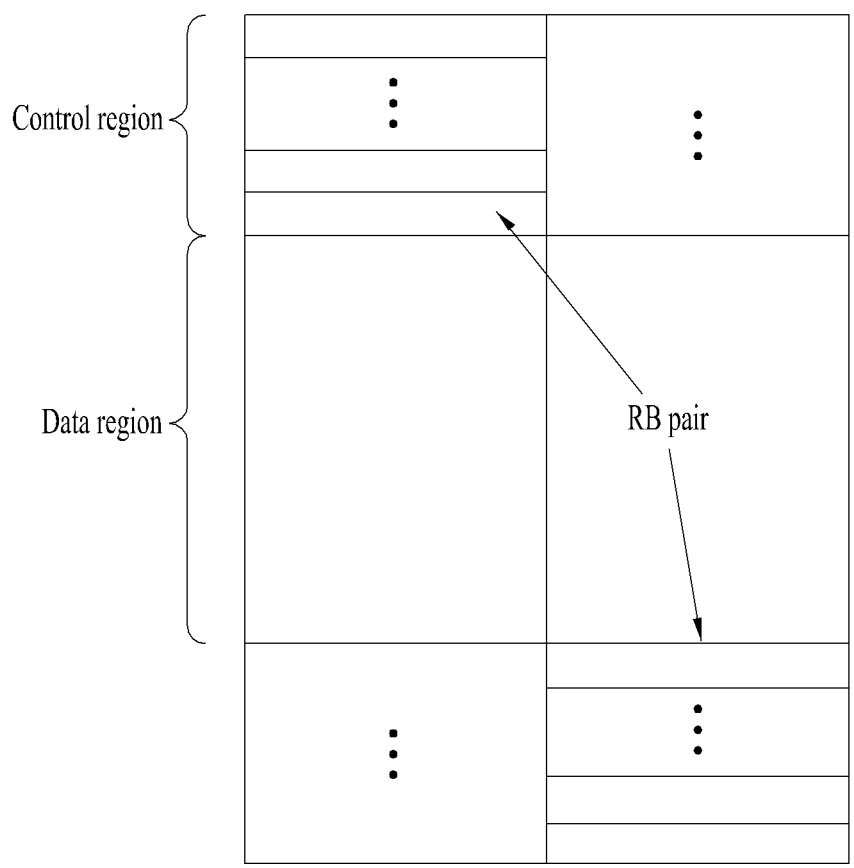
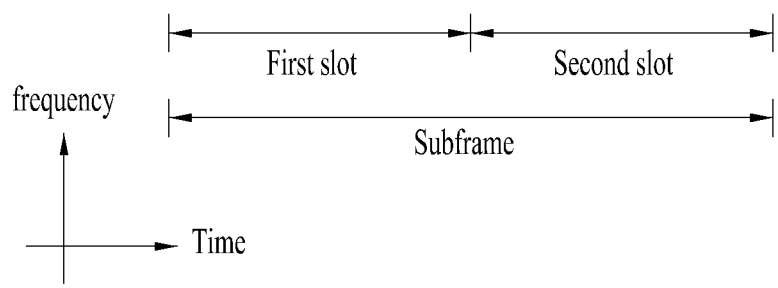

METHOD AND APPARATUS FOR TRANSMITTING AND RECEIVING MCS INDEX FOR 256QAM IN WIRELESS ACCESS SYSTEM

CROSS-REFERENCE TO RELATED APPLICATIONS

This Application is a Continuation of U.S. patent application Ser. No. 15/208,096 filed on Jul. 12, 2016 (now U.S. Pat. No. 9,698,960 issued on Jul. 4, 2017), which is a Continuation of U.S. patent application Ser. No. 14/107,709 filed on Dec. 16, 2013 (now U.S. Pat. No. 9,419,772 issued on Aug. 16, 2016), which claims the benefit under 35 U.S.C. § 119(e) to U.S. Provisional Application Nos. 61/886,652 filed on Oct. 4, 2013, 61/883,190 filed on Sep. 27, 2013 and 61/738,361 filed on Dec. 17, 2012, all of which are hereby expressly incorporated by reference into the present application.

BACKGROUND OF THE INVENTION

Field of the Invention

The present invention relates to a wireless access system, and more particularly to methods for transmitting and receiving a Modulation and Coding Scheme (MCS) index supporting a 256 Quadrature Amplitude Modulation (QAM) scheme and apparatuses for supporting the same.

Discussion of the Related Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

SUMMARY OF THE INVENTION

Accordingly, the present invention is directed to a method and apparatus for transmitting and receiving an MCS index for 256QAM in a wireless access system that substantially obviates one or more problems due to limitations and disadvantages of the related art.

A current LTE/LTE-A system is designed to adopt Quadrature Phase Shift Keying (QPSK), 16 Quadrature Amplitude Modulation (16QAM), and 64QAM as the modulation schemes. However, in order to increase the data transmission amount as well as to efficiently use radio resources, many people and developers are conducting intensive research into a method for indicating whether to use 256QAM having a higher modulation order. However, a new transport block size should be defined to support 256QAM, and new MCS signaling for supporting the 256QAM scheme needs to be defined.

An object of the present invention is to provide a method for efficiently transmitting data.

Another object of the present invention is to provide a method for defining a new MCS index and a new transport block (TB) size in association with downlink (DL) data transmission having a high modulation order.

Another object of the present invention is to provide MCS signaling methods for indicating a high modulation order.

Another object of the present invention is to provide an apparatus for supporting the above-mentioned methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

The present invention relates to a wireless access system, and more particularly to methods for transmitting and receiving a Modulation and Coding Scheme (MCS) index supporting a 256 Quadrature Amplitude Modulation (QAM) scheme and apparatuses for supporting the same.

To achieve these objects and other advantages and in accordance with the purpose of the invention, as embodied and broadly described herein, a method for receiving a Modulation and Coding Scheme (MCS) index for 256QAM (Quadrature Amplitude Modulation) in a wireless access system includes: receiving, by a user equipment (UE), a message including a 256QAM indicator indicating use of a 256QAM scheme; and receiving, by the UE, a physical downlink control channel (PDCCH) signal including the MCS index, wherein the UE obtains a modulation order and a Transport Block Size (TBS) index depending upon the MCS index for the 256QAM scheme.

The UE may simultaneously manage a first table for supporting a legacy modulation scheme and a second table for supporting the 256QAM scheme, wherein the UE obtains 256QAM and TBS index indicating a TBS for Down Link (DL) data from the second table.

The method may further include step of receiving, by the UE, downlink (DL) data modulated by the 256QAM on the basis of the TBS indicated by the TBS index, and demodulating the received DL data.

If the MCS index is 5 bits long, the physical downlink control channel (PDCCH) signal may be transmitted through one of a common search space and a UE-specific search space.

If the MCS index is 6 bits long, the PDCCH signal may be transmitted only through a UE-specific search space.

In accordance with another aspect of the present invention, a method for transmitting a Modulation and Coding Scheme (MCS) index for 256QAM (Quadrature Amplitude Modulation) in a wireless access system includes: transmitting, by a base station (BS), a message including a 256QAM indicator indicating use of a 256QAM scheme; and transmitting, by the BS, a physical downlink control channel (PDCCH) signal including the MCS index, wherein the BS modulates and transmits downlink (DL) data using a modulation order and a Transport Block Size (TBS) index depending upon the MCS index for the 256 QAM scheme.

The BS may simultaneously manage a first table for supporting a legacy modulation scheme and a second table for supporting the 256QAM scheme, wherein the BS obtains 256QAM and the TBS index indicating a TBS for Down Link (DL) data from the second table.

If the MCS index is 5 bits long, the physical downlink control channel (PDCCH) signal may be transmitted through one of a common search space and a UE-specific search space.

If the MCS index is 6 bits long, the PDCCH signal may be transmitted only through a UE-specific search space.

In accordance with another aspect of the present invention, a user equipment (UE) for receiving a Modulation and Coding Scheme (MCS) index for 256QAM (Quadrature Amplitude Modulation) in a wireless access system includes: a receiver; and a processor configured to support the 256QAM, wherein the processor controls the receiver to receive a message including a 256QAM indicator indicating use of a 256QAM scheme, and controls the receiver to receive a physical downlink control channel (PDCCH) signal including the MCS index, wherein the processor obtains a modulation order and a Transport Block Size (TBS) index depending upon the MCS index for the 256QAM scheme.

The processor may simultaneously manage a first table for supporting a legacy modulation scheme and a second table for supporting the 256QAM scheme, wherein the processor obtains 256QAM and the TBS index indicating the TBS for DL data depending upon the MCS index from the second table.

The processor may be configured to receive downlink (DL) data modulated by 256QAM on the basis of TBS indicated by the TBS index, and demodulate the received DL data.

If the MCS index is 5 bits long, the physical downlink control channel (PDCCH) signal may be transmitted through one of a common search space and a UE-specific search space.

If the MCS index is 6 bits long, the PDCCH signal may be transmitted only through a UE-specific search space.

In accordance with another aspect of the present invention, a base station (BS) for transmitting a Modulation and Coding Scheme (MCS) index for 256QAM (Quadrature Amplitude Modulation) in a wireless access system includes: a transmitter; and a processor configured to support the 256QAM, wherein the processor controls the transmitter to transmit a message including a 256QAM indicator indicating use of a 256QAM scheme, and controls the transmitter to transmit a physical downlink control channel (PDCCH) signal including the MCS index, wherein the processor modulates and transmits downlink (DL) data using a modulation order and a Transport Block Size (TBS) index depending upon the MCS index for the 256QAM scheme.

The processor may simultaneously manage a first table for supporting a legacy modulation scheme and a second table for supporting the 256QAM scheme, wherein the processor obtains 256QAM and the TBS index indicating a TBS for Down Link (DL) data, in response to the MCS index from the second table.

If the MCS index is 5 bits long, the physical downlink control channel (PDCCH) signal may be transmitted through one of a common search space and a UE-specific search space.

If the MCS index is 6 bits long, the PDCCH signal may be transmitted only through a UE-specific search space.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

FIG. 4 is a diagram illustrating a structure of an uplink subframe according to the embodiments.

FIG. 1I is a block diagram illustrating a communication device for implementing methods of FIGS. 1 to 10.

DETAILED DESCRIPTION OF THE EMBODIMENTS

Figure 1:
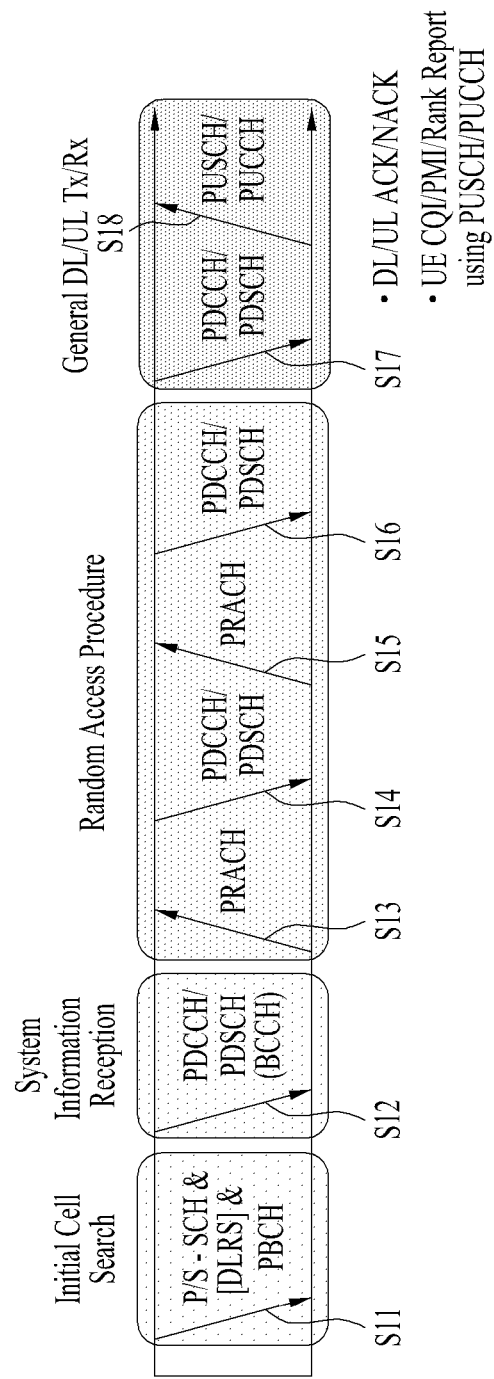
FIG. 1 is a conceptual diagram illustrating physical channels used in the embodiments and a signal transmission method using the physical channels.

The present invention relates to a wireless access system, and more particularly to methods for transmitting and receiving a Modulation and Coding Scheme (MCS) index supporting a 256 Quadrature Amplitude Modulation (QAM) scheme and apparatuses for supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS.

The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, a data block is interchangeable with a transport block in the same meaning. In addition, the MCS/TBS index table used in the LTE/LTE-A system can be defined as a first table or a legacy table, and the MCS/TBS index table which is used for supporting the 256QAM can be defined as a second table or a new table.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB. During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
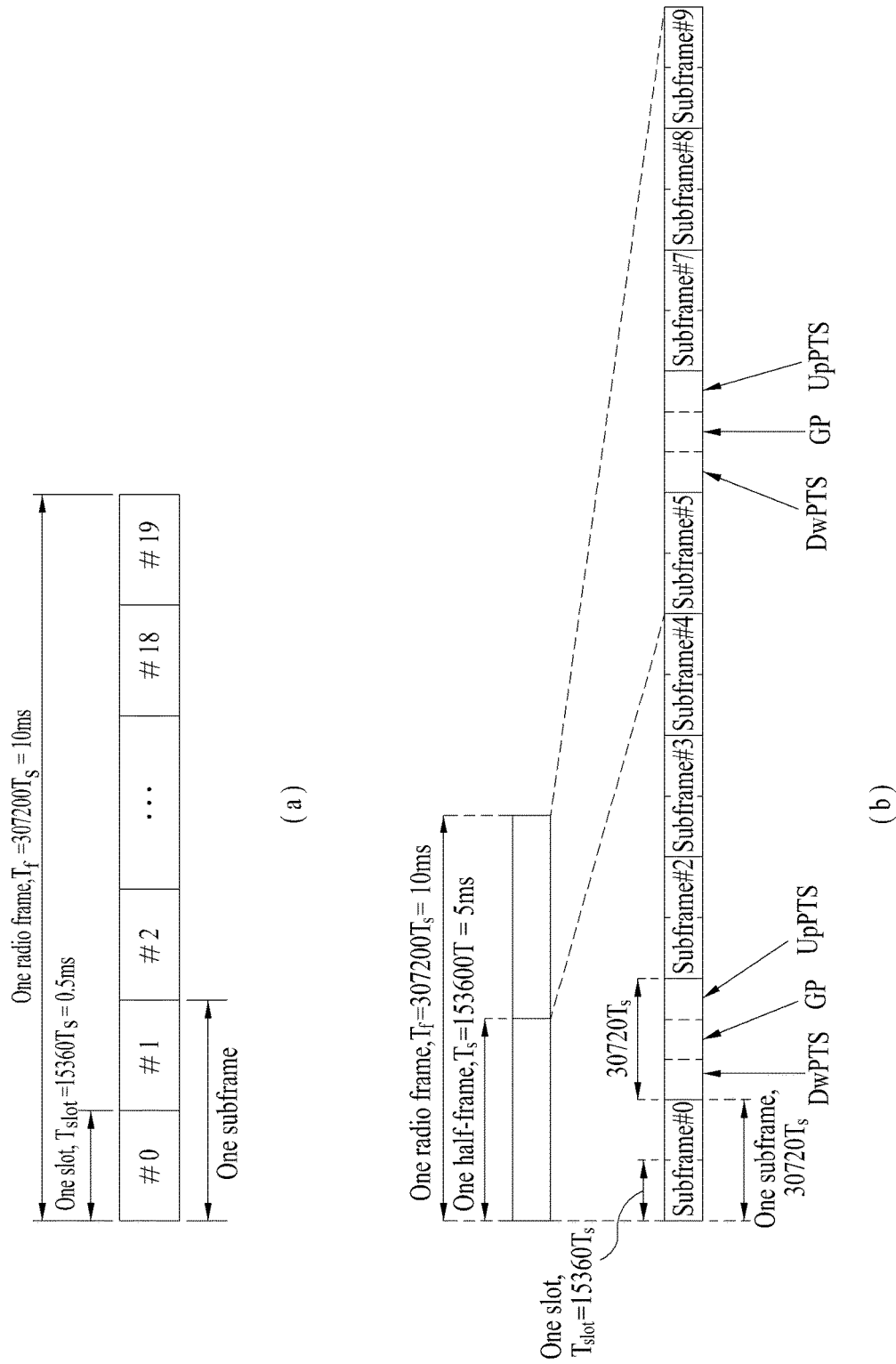
FIG. 2 is a diagram illustrating a structure of a radio frame for use in the embodiments.

FIG. 2, including view (a) and view (b), illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f$=307200·$T_s$) long, including equal-sized 20 slots indexed from 0 to 19. Each slot is 0.5 ms ($T_{slot}$=15360·$T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s$=1/(15 kHz×2048)=3.2552×10$^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f$=307200·$T_s$) long, including two half-frames each having a length of 5 ms (=153600·$T_s$) long. Each half-frame includes five subframes each being 1 ms (=30720·$T_s$) long. An $i^{th}$ subframe includes $2i^{th}$ and $(2i+1)^{th}$ slots each having a length of 0.5 ms ($T_{slot}$=15360·$T_s$). $T_s$ is a sampling time given as $T_s$=1/(15 kHz×2048)=3.2552×10$^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | | Normal cyclic prefix downlink | | | Extended cyclic prefix in downlink | |
|---|---|---|---|---|---|---|
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
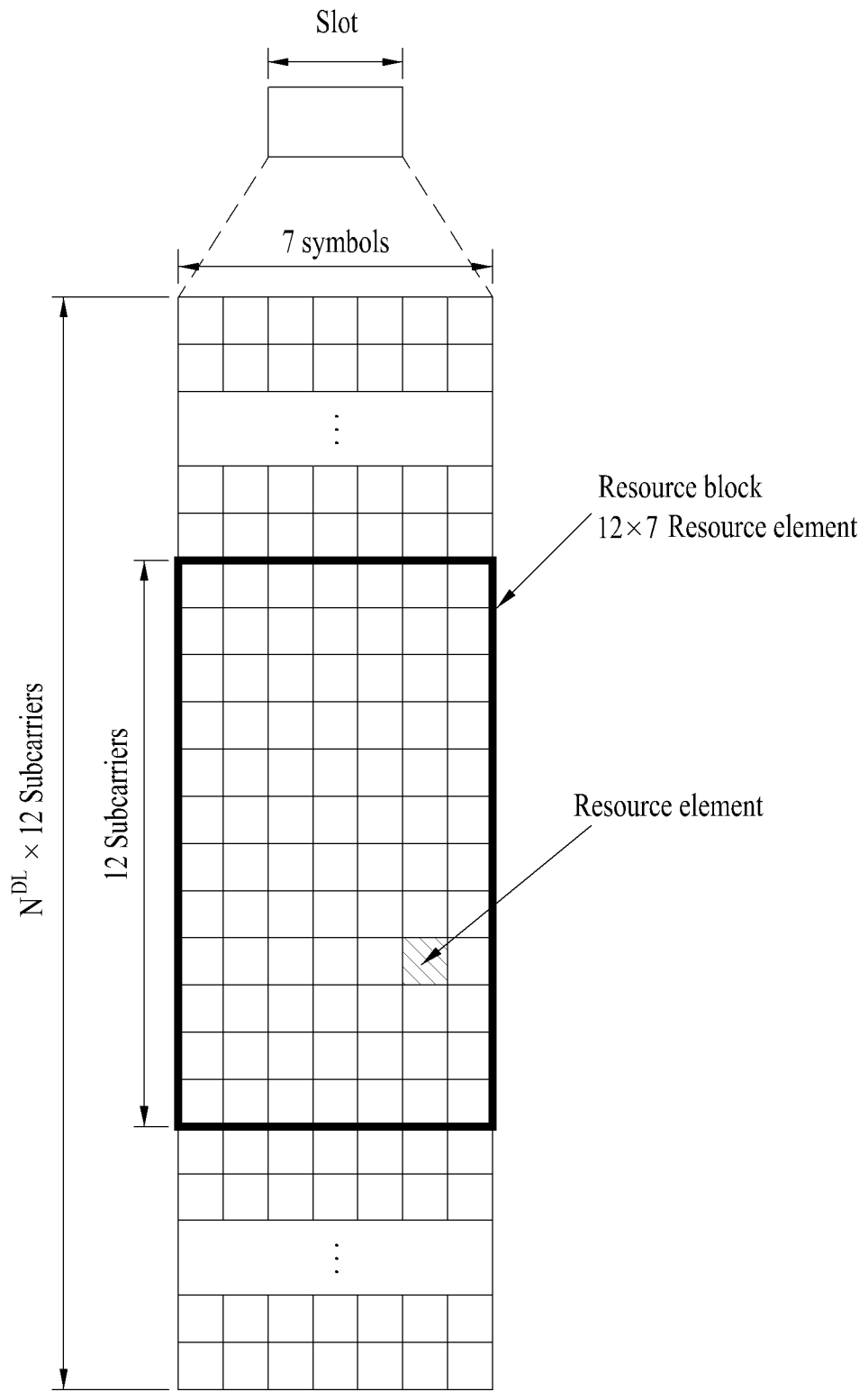
FIG. 3 is a diagram illustrating an example of a resource grid of a downlink slot according to the embodiments.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, $N_{DL}$ depends on a DL transmission bandwidth. A UL slot may have the same structure as a DL slot.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
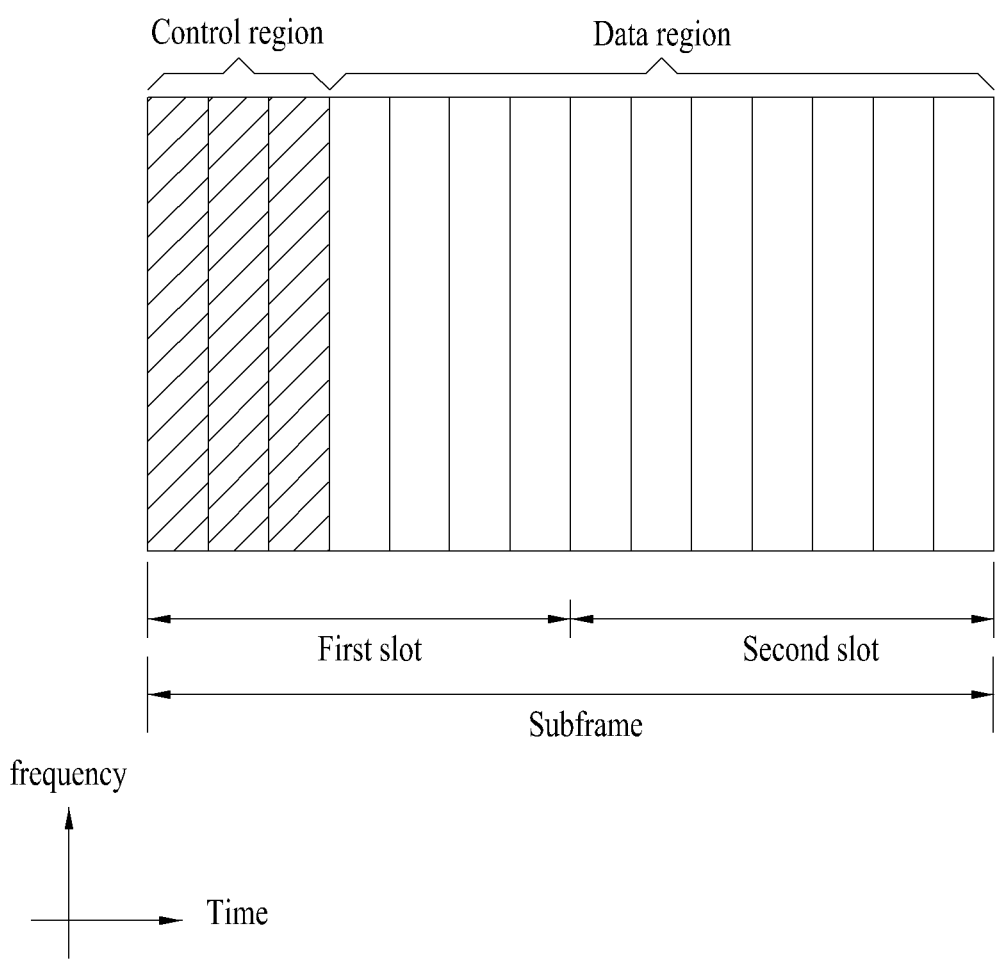
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g., the PCFICH or the PHICH). Let the number of REGs that are not allocated to the PCFICH or the PHICH be denoted by $N_{REG}$. Then the number of CCEs available to the system is $N_{CCE}$ (=$\lfloor N_{REG}/9 \rfloor$) and the CCEs are indexed from 0 to $N_{CCE}-1$.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g., Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which does not based on a codebook (Rel-8);
(8) Transmission mode 8: Precoding supporting up to two layers, which do not based on a codebook (Rel-9);
(9) Transmission mode 9: Precoding supporting up to eight layers, which do not based on a codebook (Rel-10); and
(10) Transmission mode 10: Precoding supporting up to eight layers, which do not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g., a Radio Network Temporary Identifier (RNTI)) according to the owner or usage of the PDCCH. If the PDCCH is destined for a specific UE, the CRC may be masked by a unique ID (e.g., a cell-RNTI (C-RNTI)) of the UE. If the PDCCH carries a paging message, the CRC of the PDCCH may be masked by a paging indicator ID (e.g., a Paging-RNTI (P-RNTI)). If the PDCCH carries system information, particularly, a System Information Block (SIB), its CRC may be masked by a system information ID (e.g., a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a $k^{th}$ subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format 0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1, 2, 4, 8\}$. The CCEs of PDCCH candidate set m in the SS may be determined by the following equation.

$$L \cdot \{(Y_k + m) \bmod \lfloor N_{CCE,k}/L \rfloor\} + i \quad \text{[Equation 1]}$$

where $M^{(L)}$ is the number of PDCCH candidates with CCE aggregation level L to be monitored in the SS, $m=0, \ldots, M^{(L)}-1$, i is the index of a CCE in each PDCCH candidate, and $i=0, \ldots, L-1$, $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels $\{4, 8\}$ and the USS supports PDCCHs with CCE aggregation levels $\{1, 2, 4, 8\}$. [Table 5] illustrates PDCCH candidates monitored by a UE.

TABLE 5

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k = (A \cdot Y_{k-1}) \bmod D \quad \text{[Equation 2]}$$

where $Y_{-1} = n_{RNTI} \neq 0$, $n_{RNTI}$ indicating an RNTI value. A=39827 and D=65537.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguration message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
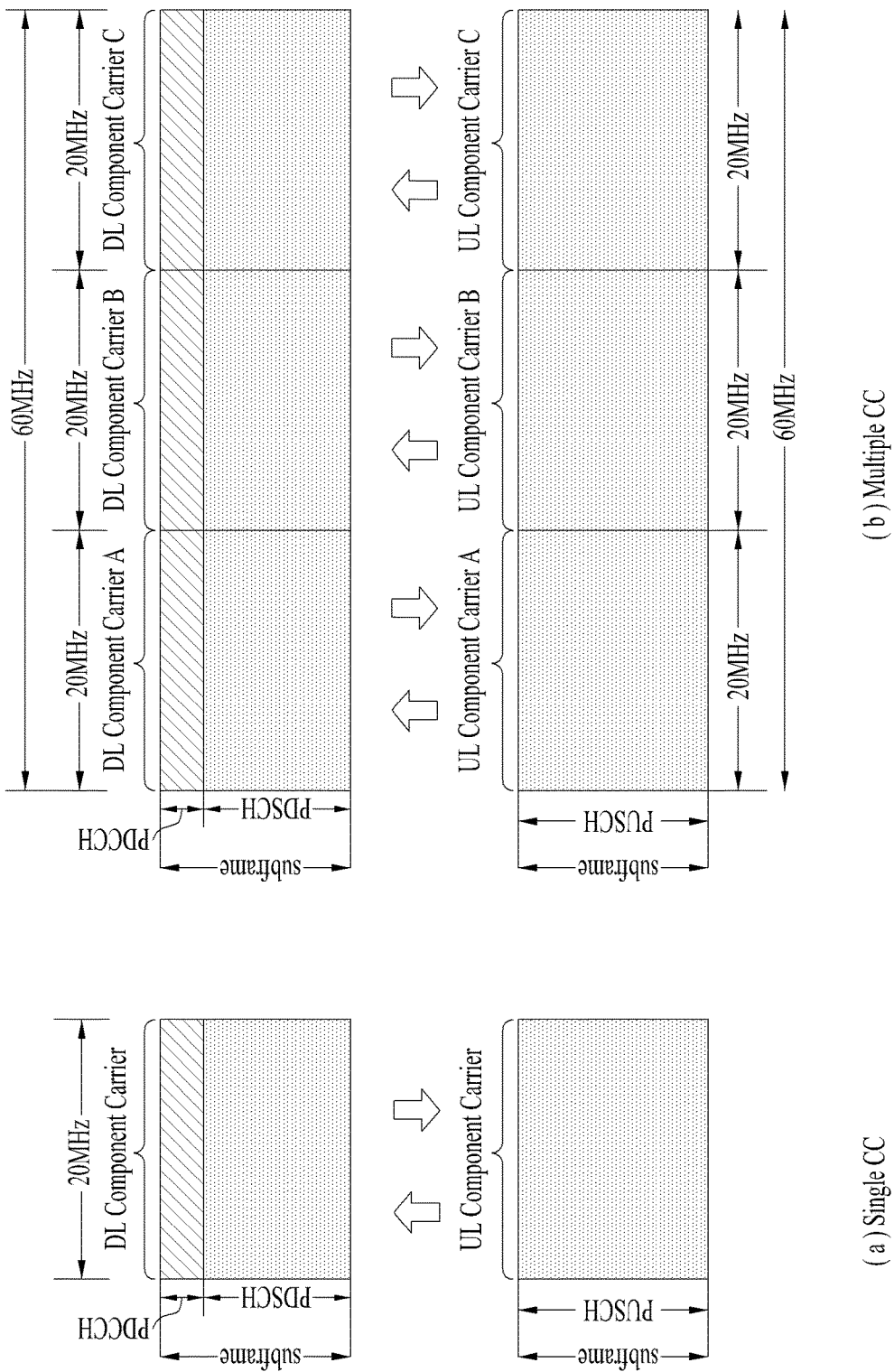
FIG. 6 is a diagram illustrating an example of a component carrier (CC) of the embodiments and carrier aggregation (CA) used in an LTE_A system.

FIG. 6, including view (a) and view (b), illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g., RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
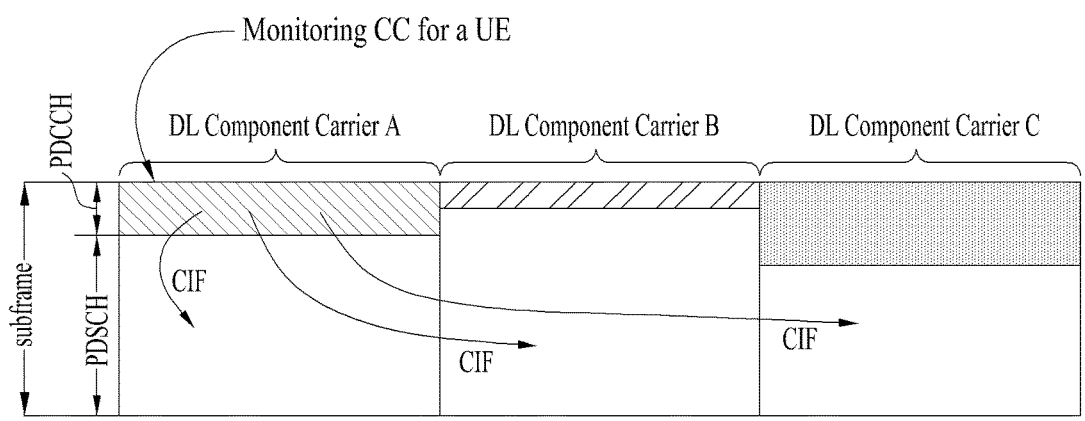
FIG. 7 illustrates a subframe structure of an LTE-A system according to cross-carrier scheduling.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
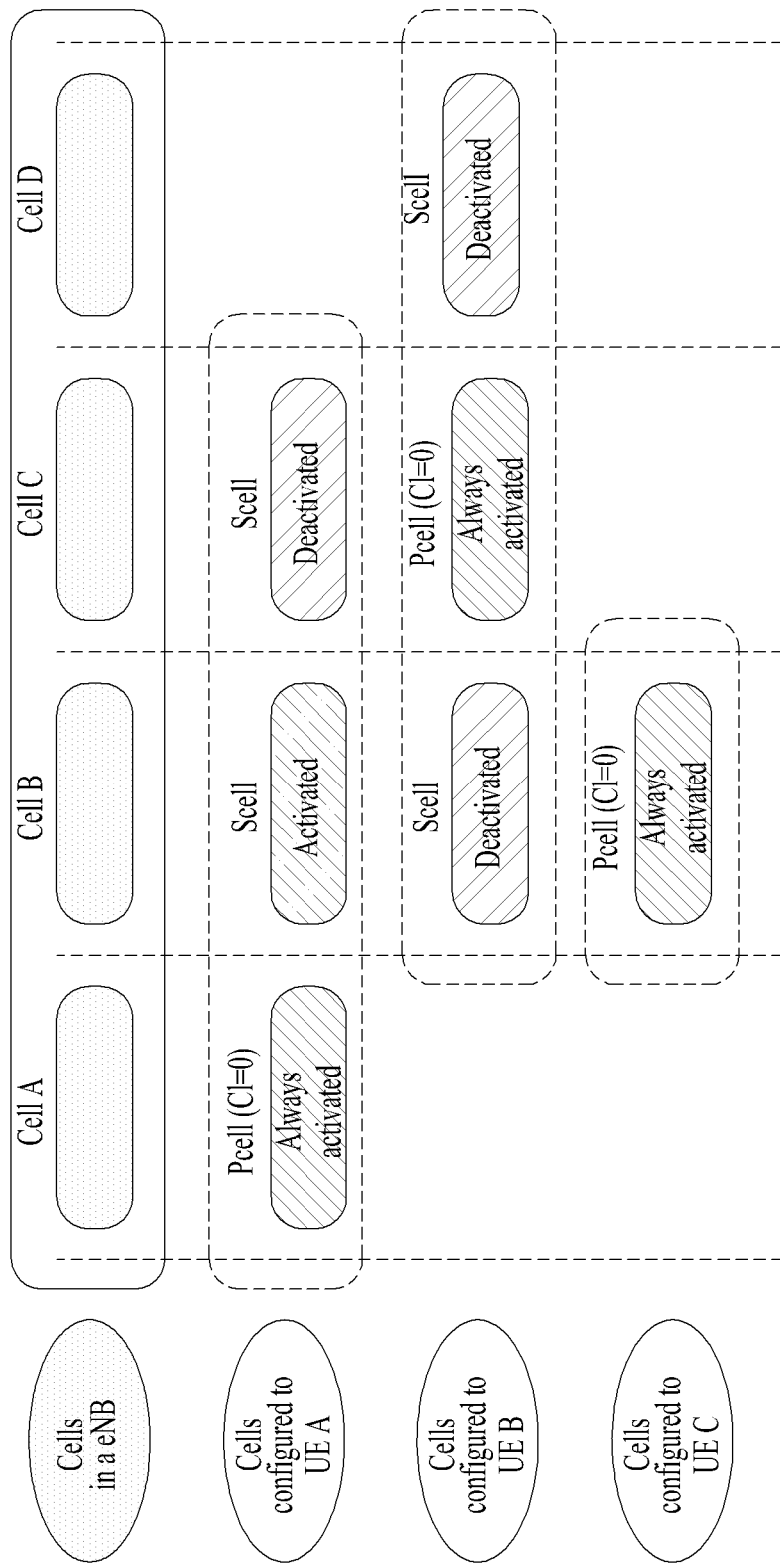
FIG. 8 is conceptual diagram illustrating a construction of serving cells according to cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of P Cell. In this case, P Cell is always activated, and S Cell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

3. Channel Encoding

A wireless access system performs coding of transmission information of a transmission end (or transmitter) using a forward error correction code, and transmits the coded information, so that channel errors can be corrected by a reception end (or receiver).

The reception end demodulates a received (Rx) signal, performs decoding of forward error correction code, and recovers transmission information. By the decoding process, errors of the Rx signal caused by a radio frequency (RF) channel can be corrected. Although various kinds of error correction codes can be applied to the embodiments, the embodiments will hereinafter be described using a turbo code as an example.

Figure 9:
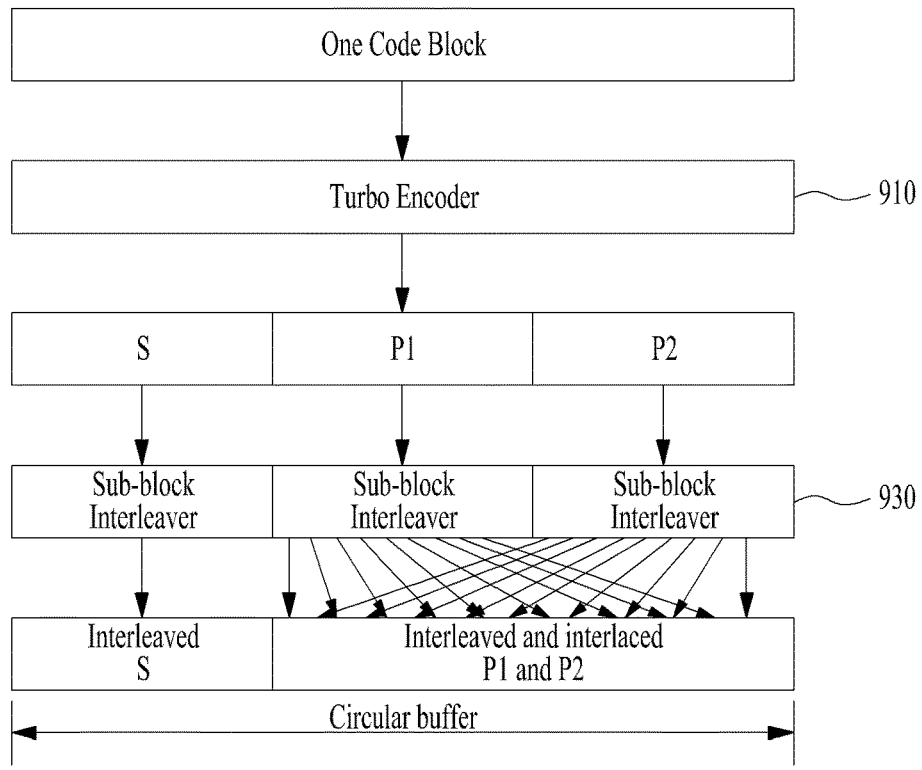
FIG. 9 is a conceptual diagram illustrating an example of rate matching using a turbo coder for use in the embodiments.

FIG. 9 is a conceptual diagram illustrating an example of rate matching using a turbo coder for use in the embodiments.

Referring to FIG. 9, the turbo coder may include a recursive systematic convolution code and an interleaver. An interleaver for facilitating parallel decoding may be used when the turbo code is actually implemented. One kind of such interleaver may be Quadratic Polynomial Permutation (QPP). The QPP interleaver may indicate a performance suitable for a specific size of a transport block (i.e., a data block), and the turbo-code performance increases in proportion to the TB size. Accordingly, to conveniently implement the turbo code by the wireless access system, the wireless access system divides a predetermined-sized TB into a plurality of small-sized TBs, and encodes the small-sized TBs. In this case, each small-sized TB is referred to as a code block.

Generally, although these code blocks have the same size, one of several code blocks may have another size due to the limitation of the QPP interleaver size. The transmitter performs the error correction coding process on the basis of a code block of the interleaver. For example, as can be seen from FIG. 9, one code block is input to the turbo coder 910. The turbo coder 910 performs 1/3 coding of an input code block, and outputs a systematic block and parity blocks (1, 2).

Thereafter, the transmitter performs interleaving of each block using the subblock interleaver 930 so as to reduce influence of burst error encountered when data is transmitted through RF channels. The transmitter may map the interleaved code block to actual radio resources, and transmit the mapped result.

Since the amount of radio resources used for transmission is constant, the transmitter performs rate matching to the encoded code block so as to adjust the amount of radio resources to the amount of radio resources to be used for transmission. Generally, rate matching may be performed through puncturing or repetition of data.

Rate matching may be performed on the basis of an encoded code block unit as in WCDMA of 3GPP. In another method, the systematic block of the encoded code block and the parity blocks are separated from each other, such that independent interleaving may be performed for the separated systematic block and each parity block. As described above, FIG. 9 shows that the systematic block and the parity blocks are separated from each other so that rate matching is carried out.

A Cyclic Redundancy Code (CRC) for error detection is attached to a transport block (TB) transmitted from a higher layer of the transmitter, and CRC is attached to each code block separated from the TB. Various TB sizes need to be defined according to service categories of a higher layer. The transmitter may perform quantization to transmit TBs to the receiver. For TB quantization, a dummy bit is added in such a manner that a source TB transmitted from the higher layer can be adjusted for the size of TB of a physical layer. In this case, quantization may be preferably performed to minimize the amount of added dummy bits.

In accordance with the embodiments, the relationship among transport Block Size (TBS) modulation, MCS, and the number of allocated resources is a function. That is, the remaining one parameter is decided according to values of any two parameters. Accordingly, if the transmitter and/or the receiver perform signaling of the corresponding parameters, the transmitter and/or the receiver must inform the counterpart device of only two of three parameters.

For convenience of description and better understanding of the present invention, it is assumed that the transmitter uses parameters associated with MCS and the number of allocated resources so as to inform the receiver of a transport block size (TBS).

As exemplary factors capable of affecting the number of allocated resources, a pilot for performing channel estimation according to antenna construction, and resources used for transmission of RS (Reference Signal) and control information may be used. The above-mentioned factors may be changed every transmission moment 4. Method for Transmitting MCS Information In order to transmit TBS of DL data to the UE, the eNB may use DL control channels (e.g, PDCCH/EPDCCH). In this case, the eNB combines MCS index indicating MCS associated information with resource allocation information, and transmits TB size information of the TB transmitted on a PDSCH to the UE.

For example, the MCS index ($I_{MCS}$) field may be configured with 5 bits, and may be assigned radio resources from 1 RB to 110 RBs. Accordingly, in the case of a non-MIMO scheme to which MIMO is not applied, signaling of a TBS (permitting a duplicate size) corresponding to {32 (states)× 110 (RBs)} is possible. However, three states (e.g., 29, 30, 31) from among the MCS index field transmitted using 5 bits may be used to indicate modification of the modulation scheme during retransmission. Therefore, signaling of a TBS corresponding to (29×110) is actually possible.

In the current LTE/LTE-A system, there are three modulation schemes supporting DL data transmission, i.e., Quadrature Phase Shift Keying (QPSK), 16QAM (Quadrature Amplitude Modulation) and 64QAM. The MCS index may indicate a modulation order and a TBS index, and the MSC index may indicate the same TBS although a different modulation scheme is used at a switching point at which the modulation scheme is changed, such that the MCS index can efficiently operate in various channel environments. The amount of information capable of being transmitted during a unit time may be slightly changed at a switching point at which the modulation scheme is changed, as compared to SINR (Signal to Interference plus Noise Ratio) variation. Therefore, although the modulation scheme is changed at the switching point, the same TBS is indicated so that radio resources can be efficiently allocated.

Considering the above-mentioned matters, the MCS index field (e.g., $I_{MCS}$) transmitted through a DL control channel is mapped to another variable (i.e., $I_{TBS}$) so as to indicate the actual TB size. The following Table 6 shows a modulation order and a TBS index ($I_{TBS}$) table according to the 5-bit MCS index ($I_{MCS}$) for use in the current LTE/LTE-A system.

TABLE 6

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

However, the current LTE/LTE-A system adopts QPSK, 16QAM, and 64QAM as the modulation scheme, $I_{MCS}$ definition for a new modulation order 8 and a new TBS for 256QAM must be defined to support 256QAM. In addition, new MCS index signaling for supporting the 256 QAM modulation scheme needs to be defined.

4.1 Method for Defining MCS Index not to Increase the Size of MCS Index Field

The following description relates to methods for supporting 256QAM by adjusting the relationship between $I_{MCS}$ and $I_{TBS}$ without changing the size of 5-bit MCS index field.

4.1.1 Redefinition of MCS Index to be Used for Retransmission

In order to change the modulation scheme without TBS modification during retransmission, one reserved state is needed. For this purpose, another $I_{MCS}$ state (e.g., $I_{MCS}$=28) other than $I_{MCS}$ states (29, 30, 31) of Table 6 may be used for 256QAM. That is, $I_{MCS}$ states (28, 29, 30, 31) may respectively modify 256QAM, QPSK, 16QAM, and 64QAM (or QPSK, 16QAM, 64QAM, and 256QAM) modulation schemes of retransmission TBS. $I_{MCS}$ is redefined in the legacy implementation scheme, such that implementation complexity can be minimized.

4.1.2 First Method (1) for Configuring MCS Index and TBS Index

Some parts of $I_{MCS}$ indicating QPSK, 16QAM, and 64QAM shown in Table 6 may indicate 256QAM. For example, assuming that three $I_{MCS}$ values are needed for indicating 256QAM, one of $I_{MCS}$ values indicating QPSK, one of $I_{MCS}$ values indicating 16QAM, and one of $I_{MCS}$ values indicating 64QAM may be respectively used as the above three $I_{MCS}$ values. For example, the lowest index (e.g., $I_{MCS}$ 0, 10, 17) or the highest index (e.g., $I_{MCS}$ 9, 16, 28) from among $I_{MCS}$ values indicating QPSK, 16QAM, and 64QAM may be used for indicating 256QAM.

4.1.3 Second Method (2) for Configuring MCS Index and TBS Index

In accordance with the second method 2, 256QAM may be indicated using $I_{MCS}$ indicating a specific modulation order of Table 6. For example, assuming that three $I_{MCS}$ values are needed for indicating 256QAM, the three $I_{MCS}$ values may be used as $I_{MCS}$ indicating 64QAM. In this case, the highest $I_{MCS}$ values (26, 27, 28) or the lowest $I_{MCS}$ values (17, 18, 19) from among $I_{MCS}$ values of 64QAM may be changed to indicate 256QAM. As a result, the relationship between spectral efficiency and $I_{MCS}$ index is denoted by positive (+) correlation, such that it can efficiently indicate TBS.

TABLE 7

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 8 | 20 |
| 24 | 8 | 21 |
| 25 | 8 | 22 |
| 26 | 8 | 23 |
| 27 | 8 | 24 |
| 28 | 2 | reserved |
| 29 | 4 | |
| 30 | 6 | |
| 31 | 8 | |

Referring to Table 7, the size of a legacy MCS index field is not increased to support 256QAM, the relationship between $I_{MCS}$ and $I_{TBS}$ is adjusted to support 256QAM. As can be seen from Table 7, the same $I_{TBS}$ may be allocated to two $I_{MCS}$ values at which 64QAM and 256QAM schemes are changed.

Table 7 shows a combination result of Section 4.1.1 and Section 4.1.3. The above-mentioned scheme shown in Table 7 may be used to generate a new table by combining content of Section 4.1.1 with content of Section 4.1.2.

In addition, although Table 7 shows a method for using $I_{MCS}$ for 256QAM at $I_{MCS}$ indicating the legacy 64QAM, some parts of $I_{MCS}$ value indicating QPSK or 16QAM may be selected as described above, so that the selected parts may be modified to indicate 256QAM as shown in Table 7.

4.1.4 Third Method (3) for Configuring MCS Index and TBS Index

In accordance with a method for maintaining the legacy $I_{MCS}$ size without change, reserved bits unused in a DL control channel are combined with field(s) and/or state(s) used in the DL control channel, such that the combination result may indicate 256QAM scheme. In case of using the third method (3), backward compatibility with the legacy system can be maintained.

In this case, $I_{TBS}$ indicating TBS of 256QAM is irrelevant to $I_{MCS}$, an additional $I_{TBS}$ value other than 26 must be defined at $I_{TBS}$ 1 so as to support TBS signaling. That is, values of individual fields shown in Table 6 remain unchanged, and TBS may be indicated by a combination of fields of the legacy control signal so as to support 256QAM. For example, assuming that four $I_{TBS}$ values are needed for supporting TBS of the 256QAM scheme, new $I_{TBS}$ values (27, 28, 29, 30) are defined so that the defined result may be used for TBS signaling corresponding to resource allocation.

4.1.5 Fourth Method (4) for Configuring MCS Index and TBS Index

The following description shows that some parts of $I_{MCS}$ indicating QPSK are used as $I_{MCS}$ supporting 256QAM, and a detailed description thereof will hereinafter be described in detail. For example, as can be seen from Table 8, $I_{MCS}$ values from 0 to 5 shown in Table 6 may indicate one of tables configured to indicate 256QAM and TBS to be used in the 256QAM.

TABLE 8

| MCS Index $I_{MCS}$ | Modulation Order $Q_m$ | TBS Index $I_{TBS}$ |
|---|---|---|
| 0 | 8 | 27 |
| 1 | 8 | 28 |
| 2 | 8 | 29 |
| 3 | 8 | 30 |
| 4 | 8 | 31 |
| 5 | 8 | 32 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 2 | reserved |
| 29 | 4 | |
| 30 | 6 | |
| 31 | 8 | |

Referring to Table 8, it can be confirmed that a new TBS is defined to support 256QAM. $I_{TBS}$ values (0~26) may be allocated to support the legacy TBS. Table 8 shows new definition of $I_{TBS}$ values (27~32) for TBS used in 256QAM.

However, on the assumption of the aforementioned MCS/TBS index mapping relationship, TBS needed for data transmission for a specific service such as VoIP may not be supported for 256QAM. Requisite TBSs to be supported are as follows. For example, TBSs (16, 24, 40, 48, 56, 72, 104, 152, 120, 232, 320, 344, 392, 440, 488, 504, and 536 bits) may be used as such requisite TBSs. Accordingly, the above-mentioned TBSs may be supported even in the MCS/TBS index mapping scheme changed for supporting 256QAM.

The MCS/TBS index mapping method changed for supporting 256QAM will hereinafter be described in detail.

A first method is as follows. Among the TBS table up to the legacy LTE-A system (Rel.11), a combination of $I_{TBS}$ indicating a necessary TBS and RB allocation may support the legacy TBS instead of TBS supporting 256QAM. For example, as can be seen from Tables 7 and 8, $I_{MCS}$ 4 and $N_{PRB}$ 7 may indicate a TBS of 488 bits according to the legacy MCS/TBS index mapping scheme. In this case, $I_{MCS}$ 4 and $N_{PRB}$ 7 for use in the MCS/TBS index mapping table supporting 256QAM may indicate 488 bits corresponding to the legacy TBS, instead of TBS of corresponding to 256QAM.

A second method is as follows. Among the TBS table up to the legacy LTE-A system (Rel.11), necessary TBS to be supported may correspond to RB allocation of 10 RBs, such that 256QAM is allocated only to RB allocation of 10 RBs or less and the legacy MCS/TBS index mapping table may be applied to RB allocation of 10 RBs or less.

As described above, on the basis of the newly defined $I_{MCS}$ and $I_{TBS}$ mapping table, the eNB transmits $I_{MCS}$ to the UE through a PDCCH signal, such that the eNB may inform the UE of specific information indicating whether 256QAM is supported, and may also inform the UE of TBS information in the case of using 256QAM. In addition, the UE may receive and demodulate a 256QAM-modulated PDSCH signal on the basis of the received $I_{MCS}$ signal.

4.2 MCS Index Definition Method for Increasing the Size of MCS Index Field

As can be seen from Section 4.1, $I_{MCS}$ size (i.e., 5 bits) defined in the LTE/LTE-A system is not increased, and the $I_{MCS}$ size is predefined to be appropriate for 256QAM. A method for defining the MCS/TBS index table supporting 256QAM by increasing the $I_{MCS}$ size will hereinafter be described in detail.

The size of $I_{MCS}$ field composed of 5 bits is increased by 1 bit, so that the increased $I_{MCS}$ field can support the 256QAM scheme and the corresponding TBS. That is, assuming the $I_{MCS}$ field is comprised of 6 bits, all or some of 32 $I_{MCS}$ values may be applied to the 256QAM scheme and the TBS signaling. Table 9 shows the mapping relationship between $I_{MCS}$ and $I_{TBS}$ in case of constructing the MCS index field composed of 6 bits.

TABLE 9

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |

TABLE 9-continued

| MCS Index $I_{MCS}$ | Modulation Order $Q_m$ | TBS Index $I_{TBS}$ |
| --- | --- | --- |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 8 | 26 |
| 30 | 8 | 27 |
| 31 | 8 | 28 |
| 32 | 8 | 29 |
| 33 | 8 | 30 |
| 34 | 8 | 31 |
| 35 | 8 | 32 |
| 36 | 8 | 33 |
| 37 | 2 | reserved |
| 38 | 4 | |
| 39 | 6 | |
| 40 | 8 | |
| 41 | reserved | reserved |
| 42 | | |
| 43 | | |
| 44 | | |
| 45 | | |
| 46 | | |
| 47 | | |
| 48 | | |
| 49 | | |
| 50 | | |
| 51 | | |
| 52 | | |
| 53 | | |
| 54 | | |
| 55 | | |
| 56 | | |
| 57 | | |
| 58 | | |
| 59 | | |
| 60 | | |
| 61 | | |
| 62 | | |
| 63 | | |

In Table 9, $I_{TBS}$ values (26~33) may be used to indicate the corresponding TBS in case of using the 256QAM scheme. Indexes shown in Table 9 are only exemplary, and may also be modified and used in various ways without departing from the scope of the present invention.

In another method, only some parts of the $I_{MCS}/I_{TBS}$ mapping table defined in Table 9 may be used as necessary. In this case, some $I_{MCS}$ values may be determined in advance, or may be notified to the UE through physical channel (L1) signaling or RRC signaling using a DL control channel.

4.2.1 $I_{MCS}$ Signaling Method

The $I_{MCS}$ field of Tables 6 to 8 is 5 bits long, and does not greatly affect the legacy LTE system even when a DCI format supported by the legacy LTE/LTE-A system is used. However, the $I_{MCS}$ field of Table 9 configured for 256QAM is 6 bits long, such that it may be impossible to use the DCI format supported by the legacy LTE/LTE-A system. In other words, the $I_{MCS}$ field is transmitted through a DCI format of a PDCCH signal. If the $I_{MCS}$ field is increased in size as shown Table 9, the DCI format is also increased in size.

For example, DCI format 1A may be applied to all of SI-RNTI, P-RNTI, RA-RNTI, C-RNTI, and SPS C-RNTI.

In this case, the increase of information bits contained in the DCI format may increase the number of BD (Blind Decoding) attempt times of the UE (See Sections 1.2.1 to 1.2.4). More specifically, DCI format 1A masked by SI-RNTI, P-RNTI, and RA-RNTI must enable the legacy UE to attempt detection. In this case, $I_{MCS}$ of 6 bits is contained in DCI format 1A by C-RNTI for the UE supporting 256QAM, such that the number of information bits of DCI format 1A is different from that of the legacy DCI format 1A. Accordingly, the UE must perform more than two additional BD actions for the same format, so that UE complexity unavoidably increases.

Therefore, in association with the legacy UE not supporting 256QAM and the other legacy UE supporting 256QAM, $I_{MCS}$ fields and TBS signaling methods need to be defined in different ways. A method for limiting MCS index signaling of the UE supporting 256QAM according to a specific condition will hereinafter be described in detail.

4.2.2 Method for Limiting Search Space $I_{MCS}$ signaling of the UE supporting 256QAM may be limited to be performed in a UE specific Search Space (USS). In the case of Common Search Space (CSS), the legacy UE must perform BD, and it is preferable that $I_{MCS}$ defined in Table 9 be signaled only through USS so as not to increase the number of BD times of the legacy UE.

4.2.3 Method for Limiting DCI Format for 256QAM

In accordance with another method, each PDCCH/EPDCCH signal masked by all or some RNTIs from among SI-RNTI, P-RNTI, RA-RNTI, C-RNTI, SPS C-RNTI, and Temporary C-RNTI may be configured not to support 256QAM. That is, the UE may recognize that $I_{MCS}$ supporting 256QAM is not applied to PDCCH/EPDCCH signals masked by SI-RNTI, P-RNTI, RA-RNTI, C-RNTI, SPS C-RNTI, or Temporary C-RNTI.

For example, after reception of the PDCCH signal masked by SPS C-RNTI, a PDSCH signal does not support 256QAM. The UE supporting 256QAM receives control information through SPS C-RNTI—masked PDCCH/EPDCCH, and the received control information may be configured to use MCS signaling supporting 64QAM instead of 256QAM. That is, even when the UE supporting 256QAM receives the SPS C-RNTI—masked PDCCH signal, DL data scheduled by a PDCCH signal is modulated into 64QAM but not 256QAM, and the UE may demodulate DL data on the basis of 64QAM.

In addition, when RRC reconfiguration for changing a system parameter and the like is performed, DCI format 1A is used. In this case, an ambiguity section in which system parameters between the eNB and the UE are different from each other may occur during RRC reconfiguration.

Accordingly, the UE supporting 256QAM has ambiguity of MCS index signaling, DCI format 1A may be limited not to be applied to MCS index signaling supporting 256QAM, such that DCI format 1A may be limited not to be applied to MCS index signaling supporting 256QAM. For example, DCI format 1A of the radio access system may be configured not to be applied to the 256QAM—modulated PDSCH signal.

More specifically, assuming that a transmission mode (TM) supporting 256QAM is 9 or 10, 256QAM may be supported only for a PDSCH signal scheduled by DCI format 2C or DCI format 2D. In this case, 256QAM may not be supported for a PDSCH signal scheduled by DCI format 1A.

4.2.4 Method for Limiting Monitoring Set

If the UE is configured to monitor DL control channels (PDCCH/EPDCCH) in a specific time or frequency domain, this configuration may be referred to as a DL control channel monitoring set. In addition, two or more DL control monitoring sets may be configured for one UE.

In this case, 256QAM may be supported only to a control channel transmitted through a DL control channel of a specific monitoring set. For example, a monitoring set of the DL control channel may be classified into an even subframe and an odd subframe in a time domain. In this case, 256QAM may be supported only to a DL control channel transmitted at the even subframe.

4.2.5 Method for Limiting 256QAM Supported Subframe

256QAM may be supported only in a specific time and/or frequency domain. Specifically, 256QAM may be supported only in a specific subframe. For example, 256QAM may be supported only in a Multicast Broadcast Single Frequency Network (MBSFN) subframe.

4.2.6 Method for Limiting Serving Cell

Carrier aggregation (CA) has been supported to systems from LTE-A. In this case, 256QAM may be supported only to a specific serving cell from among serving cells of CA. For example, 256QAM may be supported only in a component carrier configured in a P cell or a specific S cell. In this case, information indicating which serving cell is used for 256QAM support may be notified to the UE through higher layer signaling.

4.3 Method for Operating/Managing Plural MCS Tables

Table 6 shows a table for supporting TBSs up to 64QAM for use in LTE/LTE-A system, contents of the above-mentioned section 4.1 relate to a method for supporting TBSs up to 256QAM by modification of Table 6. In addition, Section 4.2 defines a new MCS index table for supporting 256QAM.

A method for operating/managing MCS tables newly defined in the embodiments and Table 6 will hereinafter be described in detail.

Specifically, Table 6 of the embodiments is referred to as a first table or a legacy table, and one of all tables (including Tables 7 to 9) newly defined in the embodiments is referred to as a second table or a new table. That is, a first table is configured to support the legacy modulation scheme (e.g., QPSK, 16QAM, 64QAM), and a second table is configured to support the legacy modulation scheme and 256QAM.

Figure 10:
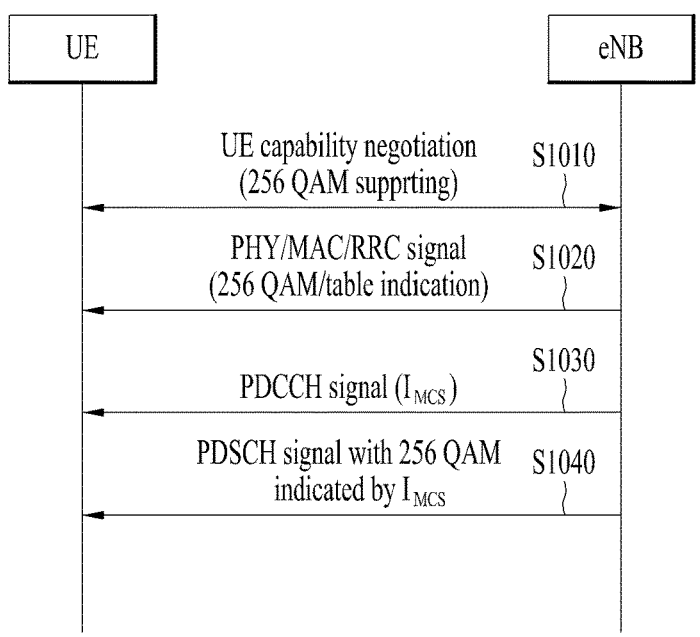
FIG. 10 is a flowchart illustrating one of methods for transmitting an MCS index supporting 256QAM according to the embodiments.

FIG. 10 is a flowchart illustrating one of methods for transmitting an MCS index supporting 256QAM according to the embodiments.

In FIG. 10, it is assumed that the UE maintains the first table and the eNB maintains the second table. In this case, the first table is identical to Table 6, and defines MCS index for the legacy UE. In addition, the second table is identical to those of Tables 7 to 9, and defines the MCS index for the 256QAM supported UE. Of course, not only Tables 7 to 9, but also other tables configured to support 256QAM may be used as second tables.

Referring to FIG. 10, the UE and the eNB perform a UE capability negotiation process for negotiating whether or not 256QAM is supported after completion of initial access in step S1010.

The UE and the eNB are configured to mutually support 256QAM in step S1010, and it is assumed that various parameters and/or fields for supporting 256QAM are exchanged.

Thereafter, if it is necessary for the eNB to transmit 256QAM configured DL data, the eNB may transmit a physical layer signal (e.g., PDCCH signal and/or EPDCCH signal) including a 256QAM indicator for indicating use of 256QAM, a Table ID for indicating a second table, or a higher layer signal (e.g., MAC signal or RRC signal) to the UE in step S1020.

The UE having received the 256QAM indicator indicating use of 256QAM or the second table ID in step S1020 may recognize that DL data transferred from the eNB will be modulated by 256QAM. Accordingly, the UE may employ the second table in order to receive the DL data.

After that, the eNB may transmit the PDCCH and/or EPCCH signal including $I_{MCS}$ to the UE. In this case, since the UE prepares for the second table for 256QAM, the UE may derive a TBS in response to the $I_{MCS}$ value received from the second table in step S1030.

The eNB modulates and transmits DL data (e.g., DL-SCH signal) according to the modulation order and TBS notified to the UE through $I_{MCS}$. In addition, in step S1040, the UE receives and demodulates DL data on the basis of $I_{MCS}$ having received at step S1030.

The above-mentioned methods disclosed in Section 4.1 or Section 4.2 may be applied to the $I_{MCS}$ signaling method in step S1030. For example, according to the method disclosed in Section 4.1, the MCS/TBS index table (i.e., second table) for supporting 256QAM is 5 bits long. Therefore, signaling of the PDCCH/EPDCCH signal including $I_{MCS}$ of step S1030 may be performed in the same manner as in the LTE-LTE-A system. In accordance with the method of Section 4.2, the MCS/TBS index table supporting 256QAM is the size of at least 6 bits. Therefore, it is preferable that signaling of the PDCCH signal including $I_{MCS}$ of step S1030 is limited to the method proposed by Section 4.2, and the signaling result is then transmitted.

In another embodiment, the eNB may indirectly inform the UE of specific information indicating whether the 256QAM scheme is used. For example, if a new transmission (Tx) mode for 256QAM is defined, the eNB does not perform explicit signaling as in step S1020, and informs the UE of the corresponding new Tx mode through RRC signaling, so that the UE can recognize use of the 256QAM scheme. In this case, step S1020 may not be performed.

5. Apparatuses

Figure 11:
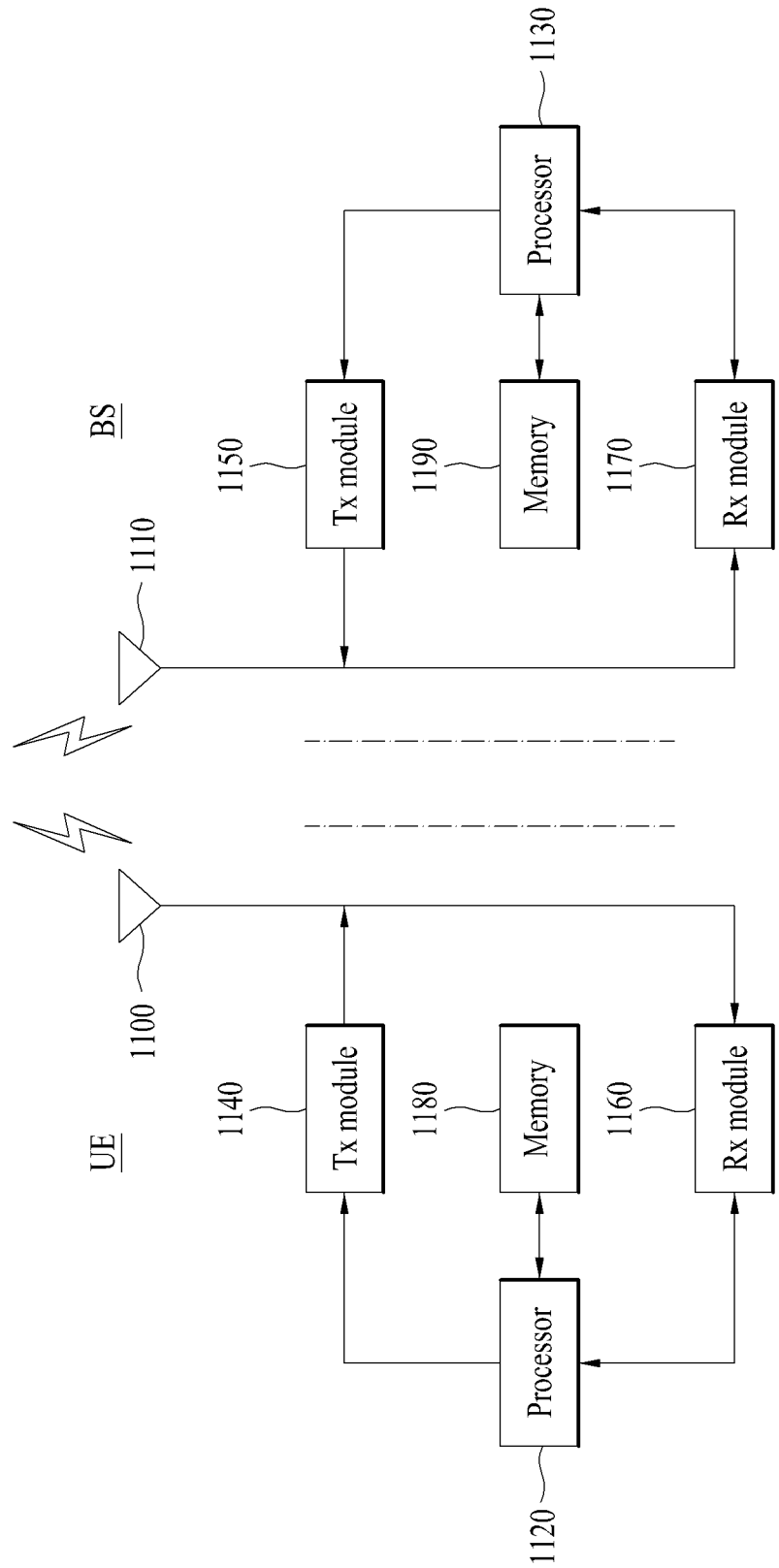

Apparatuses illustrated in FIG. 11 are means that can implement the methods described before with reference to FIGS. 1 to 10.

A UE may act as a transmitter on a UL and as a receiver on a DL. An eNB may act as a receiver on a UL and as a transmitter on a DL.

That is, each of the UE and the eNB may include a Transmission (Tx) module 1140 or 1150 and a Reception (Rx) module 1160 or 1170, for controlling transmission and reception of information, data, and/or messages, and an antenna 1100 or 1110 for transmitting and receiving information, data, and/or messages.

Each of the UE and the eNB may further include a processor 1120 or 1130 for implementing the afore-described embodiments of the present disclosure and a memory 1180 or 1190 for temporarily or permanently storing operations of the processor 1120 or 1130.

The embodiments of the present disclosure may be performed using the components and functions of the UE and the eNB described from the first section to the fourth section. For example, the processor of the eNB can maintain and manage the MCS/TBS index table and signal an $I_{MCS}$ supporting the 256QAM. The detail methods can be referred to the sections 1 to 4.

The Tx and Rx modules of the UE and the eNB may perform a packet modulation/demodulation function for data transmission, a high-speed packet channel coding function, OFDMA packet scheduling, TDD packet scheduling, and/or channelization. Each of the UE and the eNB of FIG. 11 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g., CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1180 or 1190 and executed by the processor 1120 or 1130. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

As is apparent from the above description, the embodiments of the present invention have the following effects.

First, the embodiments can transmit and receive DL data using a high-order modulation scheme, and can efficiently transmit and receive data.

Second, the embodiments can provide a new MCS index and a new transport block (TB) size in association with DL data transmission having a high modulation order.

Third, the embodiments can provide new MCS signaling methods for indicating a modulation order and a TB size in the case of supporting the high modulation order.

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting downlink data in a wireless access system, the method performed by an evolved Node B (eNB) and comprising:
   transmitting a higher layer signal including an indication that 256 quadrature amplitude modulation (256QAM) is to be enabled;
   transmitting, via a physical downlink control channel (PDCCH), downlink control information (DCI) for scheduling a physical downlink shared channel (PDSCH); and
   transmitting, via the PDSCH, downlink data based on the DCI;
   wherein the eNB has a first MCS index table supporting up to 64 quadrature amplitude modulation (64QAM) and a second MCS index table supporting up to 256QAM, and
   wherein the downlink data is encoded based on the first MCS index table even though the second MCS index table has been enabled, when a format of the DCI is a DCI format 1A and the DCI format 1A has been scrambled with a semi persistent scheduling radio network temporary identifier (SPS-RNTI).

2. The method according to claim 1, wherein the DCI format 1A includes an index field representing a modulation and coding scheme (MCS) for the PDSCH.

3. The method according to claim 2,
   wherein the downlink data is encoded by the eNB using the MCS represented by the index field, and
   a modulation order and a transport block size (TBS) index is determined depending upon an MCS index in the first MCS index table.

4. The method according to claim 1, wherein the first MCS index table and the second MCS index table are represented by 5 bits.

5. An evolved Node B (eNB), comprising:
   a transmitter; and
   a processor;
   wherein the processor is configured to encode downlink data using one of two modulation and coding scheme (MCS) tables, and
   the processor is configured to control the transmitter to:
      transmit a higher layer signal including an indication that 256 quadrature amplitude modulation (256QAM) is to be enabled,
      transmit, via a physical downlink control channel (PDCCH), downlink control information (DCI) for scheduling a physical downlink shared channel (PDSCH), and
      transmit, via the PDSCH, the downlink data based on the DCI;
   wherein the processor has a first MCS index table supporting up to 64 quadrature amplitude modulation (64QAM) and a second MCS index table supporting up to the 256QAM, and
   wherein the downlink data is encoded by the processor based on the first MCS index table even though the second MCS index table has been enabled, when a format of the DCI is a DCI format 1A.

6. The eNB according to claim 5, wherein the DCI format 1A includes an index field representing a modulation and coding scheme for the PDSCH.

7. The eNB according to claim 6,
   wherein the downlink data is encoded by the eNB using the MCS represented by the index field, and
   a modulation order and a transport block size (TBS) index is determined depending upon an MCS index in the first MCS index table.

8. The eNB according to claim 5, wherein the first MCS index table and the second MCS index table are represented by 5 bits.

9. A method for receiving downlink data in a wireless access system, the method performed by a user equipment (UE) and comprising:
   receiving a higher layer signal including an indication that 256 quadrature amplitude modulation (256QAM) is to be enabled;
   receiving, via a physical downlink control channel (PDCCH), downlink control information (DCI) for scheduling a physical downlink shared channel (PDSCH); and
   receiving, via the PDSCH, downlink data based on the DCI;
   wherein the UE has a first MCS index table supporting up to 64 quadrature amplitude modulation (64QAM) and a second MCS index table supporting up to 256QAM, and
   wherein the downlink data is decoded based on the first MCS index table even though the second MCS index table has been enabled, when a format of the DCI is a DCI format 1A and the DCI format 1A has been scrambled with a semi persistent scheduling radio network temporary identifier (SPS-RNTI).

10. The method according to claim 9, wherein the DCI format 1A includes an index field representing a modulation and coding scheme for the PDSCH.

11. The method according to claim 10, wherein the downlink data is encoded by the eNB using the MCS represented by the index field, and
   a modulation order and a transport block size (TBS) index is determined depending upon an MCS index in the first MCS index table.

12. The method according to claim 9, wherein the first MCS index table and the second MCS index table are represented by 5 bits.

13. A user equipment (UE), comprising:
   a receiver; and
   a processor;
   wherein the processor is configured to decode downlink data using one of two modulation and coding scheme (MCS) tables, and
   the processor is configured to control the transmitter to:
      receive a higher layer signal including an indication that 256 quadrature amplitude modulation (256QAM) is to be enabled,
      receive, via a physical downlink control channel (PDCCH), downlink control information (DCI) for scheduling a physical downlink shared channel (PDSCH), and
      receive, via the PDSCH, the downlink data based on the DCI;

wherein the processor has a first MCS index table supporting up to 64 quadrature amplitude modulation (64QAM) and a second MCS index table supporting up to the 256QAM, and wherein the downlink data is decoded by the processor based on the first MCS index table even though the second MCS index table has been enabled, when a format of the DCI is a DCI format 1A.

14. The UE according to claim 13, wherein the DCI format 1A includes an index field representing a modulation and coding scheme for the PDSCH.

15. The UE according to claim 14, wherein the downlink data is encoded by the eNB using the MCS represented by the index field, and a modulation order and a transport block size (TBS) index is determined depending upon an MCS index in the first MCS index table.

16. The UE according to claim 13, wherein the first MCS index table and the second MCS index table are represented by 5 bits.

* * * * *